Patented Apr. 19, 1932

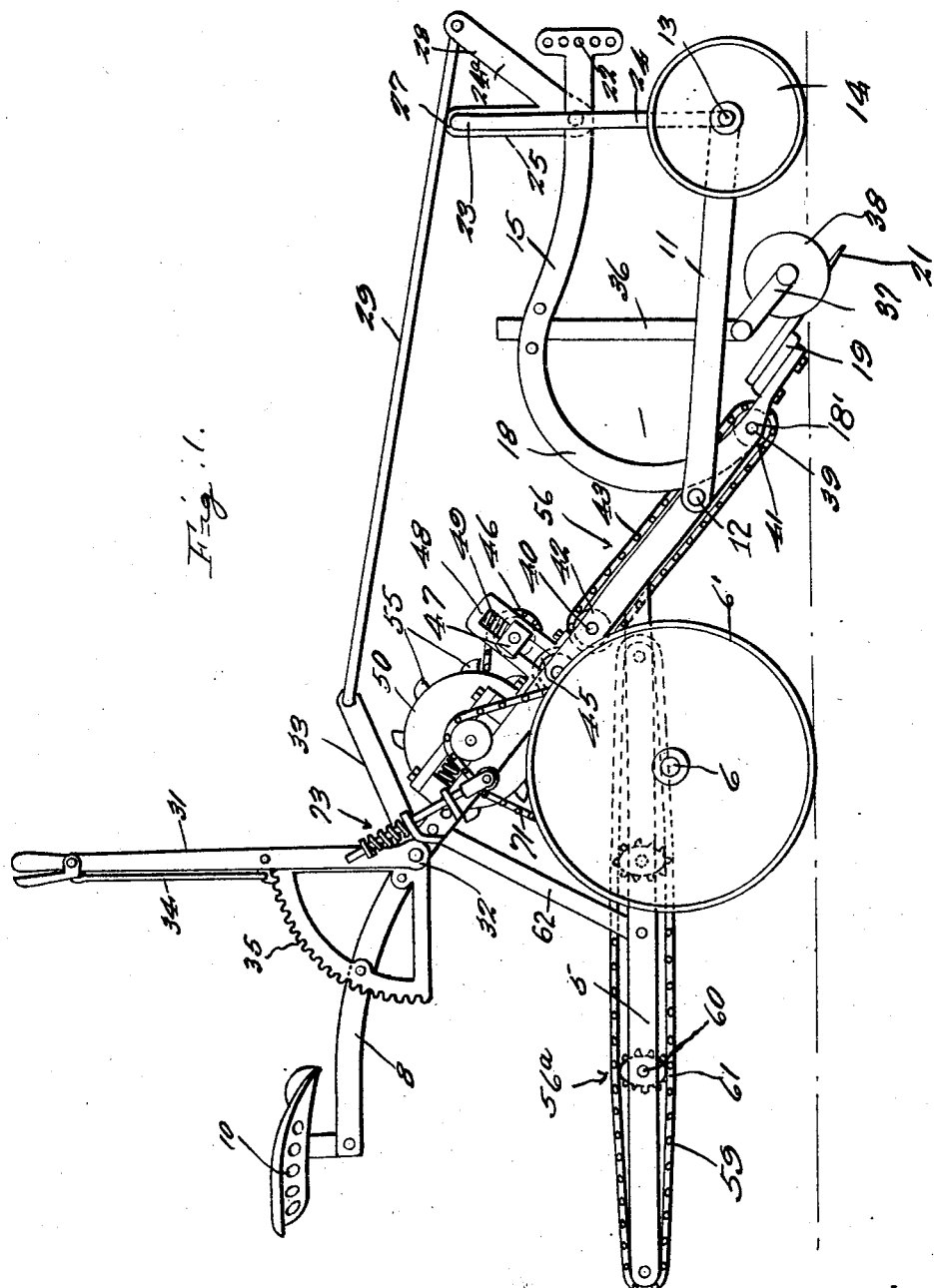

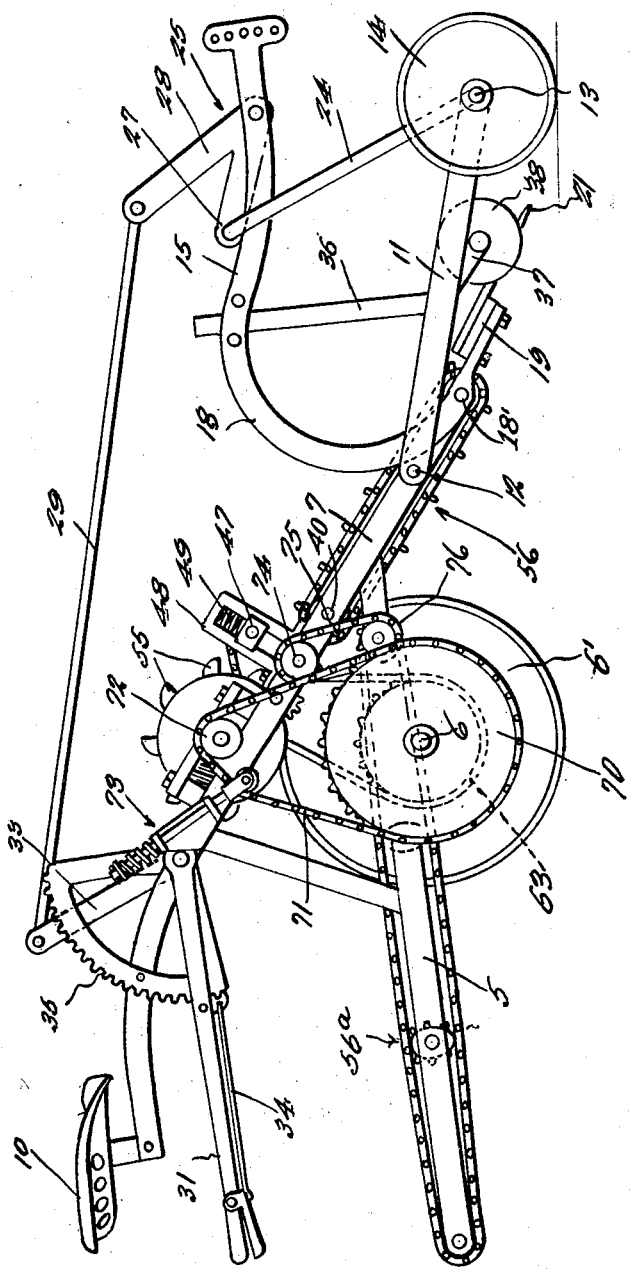

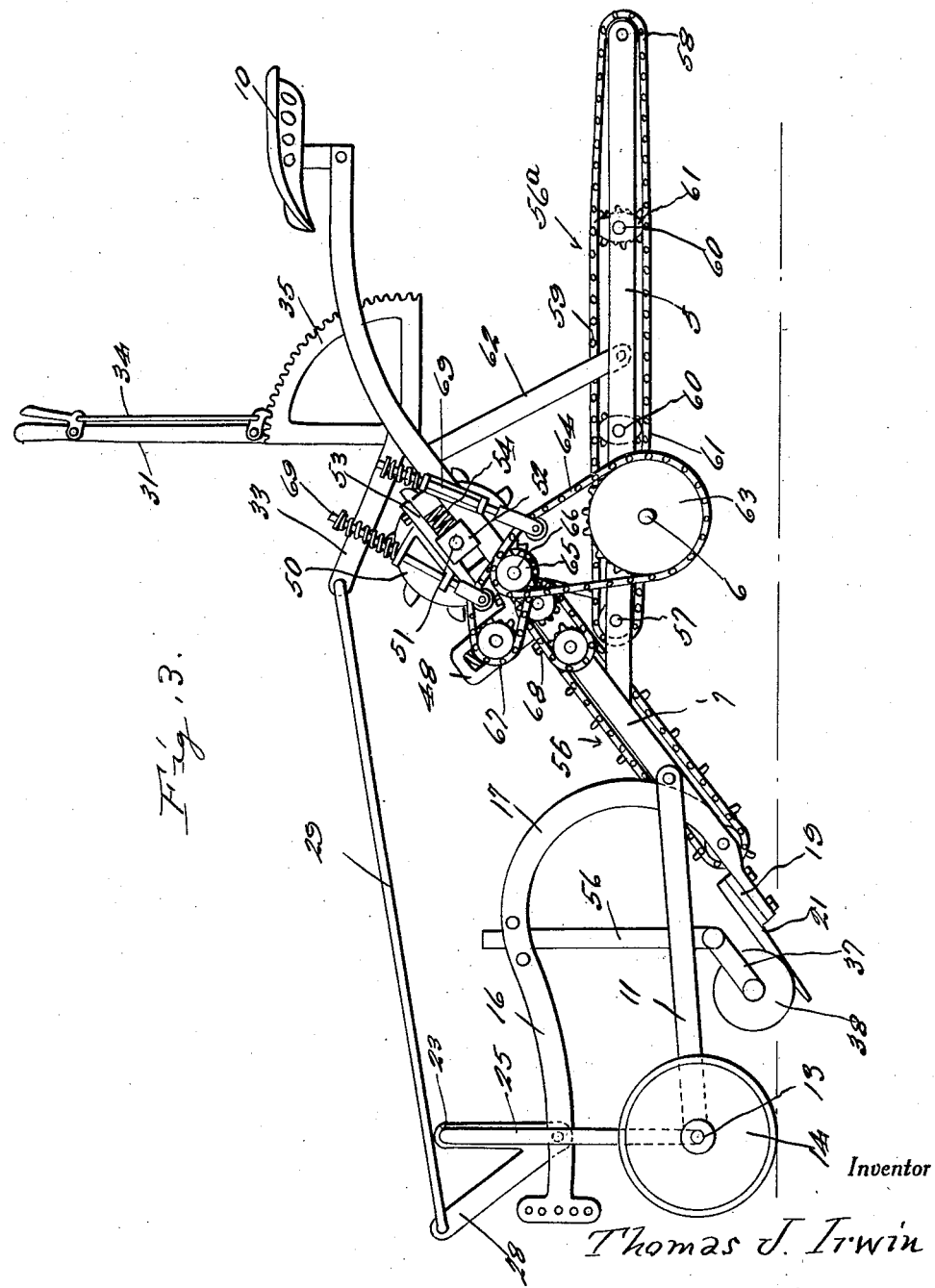

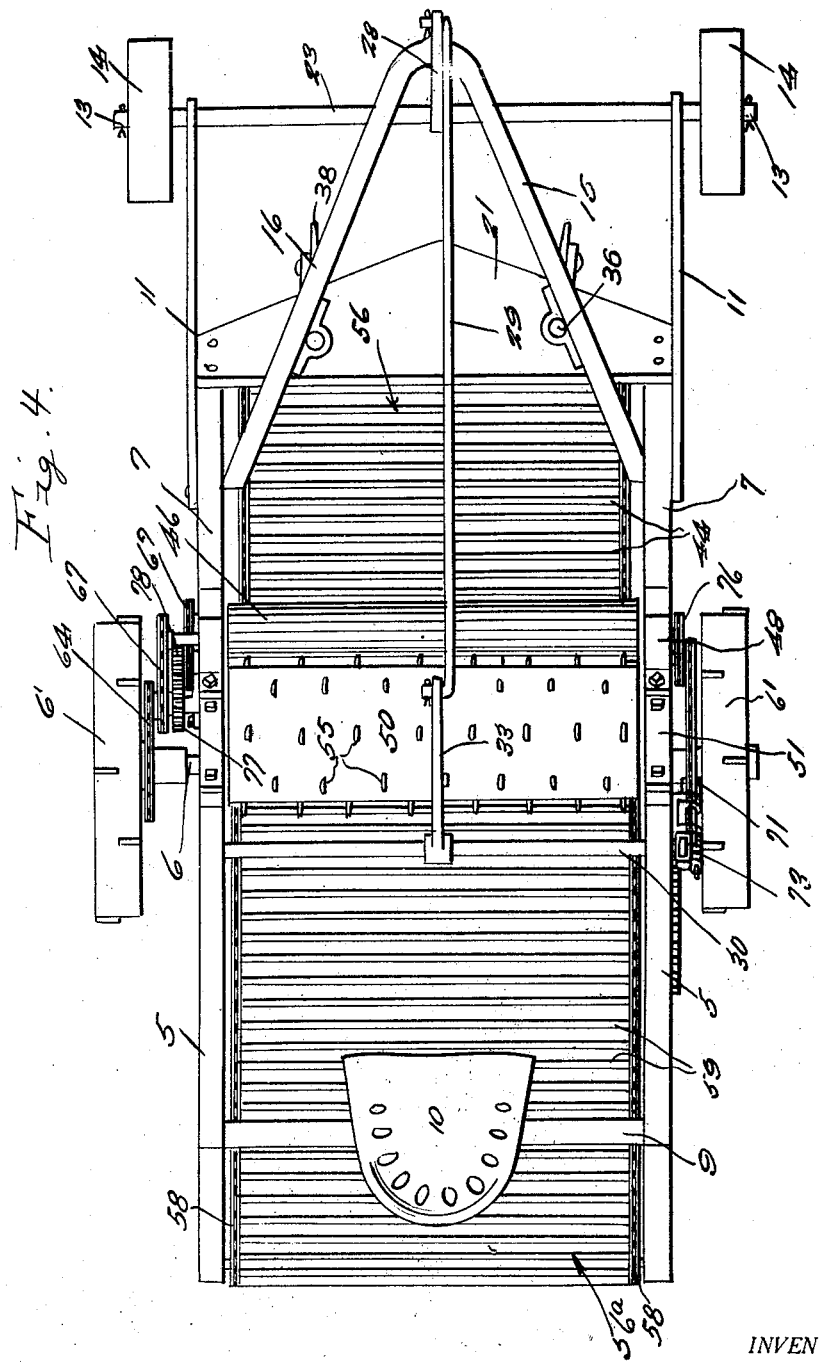

1,854,261

UNITED STATES PATENT OFFICE

THOMAS J. IRWIN, OF CADOTT, WISCONSIN

QUACK GRASS DIGGER

Application filed November 8, 1929. Serial No. 405,723.

This invention relates to quack grass diggers and has as its primary object the provision of certain new and useful improvements in devices of this character, the invention comprehending the provision of a quack grass digger comprising a mobile frame structure which may be drawn over the ground by suitable draft means and embodying means for digging the quack grass or other roots from the ground, separating the roots from the earth, whereupon the earth may fall to the ground leaving the roots on the machine so that the roots may be burned or otherwise destroyed.

A still further object of the invention is to provide a device of this character above mentioned, embodying means for raising or lowering the digging mechanism into and out of operation, of suitable conveying means for conveying the roots so dug out of the ground rearwardly of the machine through a suitable means for separating the earth from the roots, after which the roots may then fall upon a suitable shaker mechanism for freeing the roots of any remaining dirt.

A still further object of the invention is to provide a quack grass digger wherein the revolving separating mechanism will be equipped with suitable driving connection embodying means for releasing the driving connection and thus avoid breakage or other damage in case the machine is brought to a sudden stop.

Other objects and advantages of the invention will become apparent during a study of the following description, taken in connection with the accompanying drawings wherein:

Figure 1 is a side elevation of the machine looking at the machine from one side thereof, Figure 2 is a side elevation of the machine looking at the machine from the same side as that in Figure 1 and showing the digger member in a raised or inoperative position, the drive wheel on one side being omitted.

Figure 3 is a side elevation of the machine looking at the machine from the opposite side thereof, and with both drive wheels omitted.

Figure 4 is a top plan view of the machine.

With reference more in detail to the drawings, it will be seen that my improved quack grass digger comprises a main frame comprising spaced parallel coextensive side bars 5—5 mounted adjacent the forward end thereof on a wheel supported axle 6, the wheels being designated by the reference character 6'.

The wheels 6' are usual drive wheels as are employed in machines of this nature. At its forward end, the main wheel supported frame merges into an obliquely disposed frame embodying side members 7—7. The frame last referred to may have its said side members 7—7 formed integral with the side members 5—5 of the main frame or otherwise secured thereto adjacent the lower end of said frame side members 7—7.

The side members 7—7 incline upwardly and rearwardly to terminate in rear curved extensions 8. At their rear ends the frame members 7—7 are connected by a cross bar 9, upon which cross bar 9 intermediate the ends thereof is a seat 10 for the operator of the machine.

There is also provided at the forward end of the machine a draft frame comprising coextensive side frame members 11—11 which frame members have their rear ends secured as at 12 to the lower forward end of the oblique frame, being secured to the side members 7—7 of said frame.

At their forward ends, the frame members 11 of the draft frame are connected through the medium of a transversely disposed pivot axle 13 which axle is supported on wheels 14. A pair of draft beams are designated by the reference characters 15 and 16 respectively, and at their rear ends these means 15 and 16 terminate in substantially C-shaped curved extensions 17 and 18 respectively, the said curved ends 17, 18, adjacent their free extremities being secured as at 18' to the lowermost end of the frame members 7—7.

The said extremities of the curved ends 17 and 18 of said beams are connected by a cross member 19, to which cross member 19 is rigidly secured a conventional shovel or plow share 21 to extend forwardly of and transversely of the lower end of said upwardly and rearwardly inclined frame.

At their forward ends, the beams 15 and 16 converge toward one another to terminate integrally with one another to provide a suitable draft connection 22.

To raise or lower the plow 21 into and out of digging contact with the ground, there is provided an inverted U-shaped actuating frame 23, the legs 24 of which straddle the beams 15 and 16 adjacent their forward connected ends, and the lower ends of these legs are suitably secured to the axle 13 adjacent the ends of said axle.

A substantially V-shaped member 24a has one leg 25 thereof rigidly secured at its free end to the crown portion 27 of the U-shaped frame 23. At its apex, the V-shaped member 24a is secured to the connected end of the beams 15 and 16, and the remaining leg 28 of said member 24a has one end of a connecting rod 29 pivotally secured thereto.

Mounted in the upper end of the obliquely disposed frame forwardly of the seat 10, and having its end supported in the frame members 7 is a rock shaft 30. An operating lever 31 is mounted on the shaft 30 adjacent one end of the shaft as at 32. A crank arm 33 is provided on an intermediate portion of the shaft 30 and is pivotally connected with one end of the operating rod 29.

For maintaining the plow 21 in any adjusted position relative to the ground, the lever 31 is equipped with a suitable detent structure 34 for engagement with a segment 35 suitably mounted adjacent the operating lever 31.

Each of the beams 15 and 16 adjacent their rear curved ends 17 and 18 have shanks 36 depending therefrom, and these shanks 36 at their lower ends terminate in offsets 37, upon the extreme ends of which offsets 37 are rotatably mounted disks 38, which disks 38 have their periphery suitably sharpened for cutting the sod at opposite sides of the plow share 21.

Manifestly, when the plow share 21 is in that position shown to advantage in Figure 1, for digging up the ground as the machine is drawn thereover, the sod so dug up during the progress of the machine will be forced rearwardly of the plow share and on to an upwardly and rearwardly inclined endless conveyor 56 which comprises forward and rearward shafts 39 and 40 respectively the ends of which are journaled in the lowermost ends of the frame members 7—7 intermediate the ends of said frame members and slightly above the forward end of the main frame.

The forward shaft 39 at its opposite ends is equipped with suitable sprockets 41, while the rear shaft 40 at its opposite ends is equipped with suitable sprockets 42 and over the sprockets 41 and 42 are trained the side chains 43 of the conveyor, which chains 43 are connected by a plurality of suitably spaced bars 44 which form the body of the conveyor, and through which bars the dirt or earth of the sod may drop therethrough to the ground as the roots are being conveyed upwardly and rearwardly to pass between the lower rollers 45 and 46 respectively. The lowermost roller 45 is mounted for rotation between the frame members 7—7 parallel to the shaft 40 and in spaced relation to the upper rear end of the conveyor 56.

The upper roller 46 is provided at opposite ends thereof with pintles journaled in bearings 47, which bearings 47 are slidably mounted in guide frames 48 rising from the frame members 7—7. Arranged within the guide frames 48 are coil springs 49, the upper ends of which springs 49 bear against the top of the frames 48 and the lower ends of these springs impinge against the slidably mounted bearings 47.

The rollers 45 and 46 are corrugated as shown to advantage in Figure 4 and the sod from the conveyor 56 is drawn between these rollers to be brought into contact with a relatively large beater roller designated generally by the reference character 50. The beater roller 50 extends transversely of said rearwardly and upwardly inclined frame, and at its opposite ends said roller is provided with pintles 51 journaled in flange bearings 52 slidable longitudinally of the frame members 7 in guide frames 53 mounted on said frame members rearwardly of the frames 48.

Coil springs 54 are mounted in the guide frames 53, one end of the coil springs impinging against one end of the same guide frame, and the other ends of said coil springs impinging against the bearing 51 but normally urging the bearing in a downward or forward direction, whereby said beater roller will be disposed in close proximity to said rollers 45 and 46.

The beater roller on its periphery is provided with suitable lugs 55, which lugs act on the sod for tearing the latter and otherwise breaking up the sod.

After being so acted upon by the roller 50, the sod is then dropped to an endless conveyor designated generally by the reference character 56a mounted in the main wheel supported frame to extend longitudinally thereof between the frame side members 5—5 for substantially the full length of said frame members.

The endless conveyor 56a has spaced parallel shafts 57, the ends of which are journalled in said frame members 5—5 adjacent the opposite ends of said frame members.

Each of the said shafts are equipped adjacent their opposite ends with suitable sprockets over which are trained the endless chain members 58, of the conveyor which chain members 58 are connected by a plurality of transverse spaced parallel connecting rods 59 which form the body of said conveyor.

In order to afford a rocking motion to the conveyor 56a, so that the sod on the upper run of the conveyor is suitably shaken so as to separate the dirt from the roots there is mounted between the frame members 5—5 a pair of spaced parallel shafts 60—60.

To the opposite ends of said shafts 60—60 are splined oblong sprockets 61 over which the endless chains 58 are trained and which will, as is obvious, impart a rocking movement to the endless conveyor during the operation of the frame. Thus, the dirt or earth will fall from the conveyor 56a and the quack grass or other roots will remain on the conveyor to be delivered to the rear end of the conveyor and there deposited in a continuous row, during the travel and operation of the machine, along the line of travel. Secured at their lowermost ends to intermediate portions of the frame members 5—5 are suitable braces 62 which extend upwardly and forwardly therefrom and have their upper ends suitably secured to the frame members 7—7 rearwardly of the beater roller 50.

As shown to advantage in Figure 3, the axle 6 which is rotatably supported in suitable bearings carried by the frame members 5—5 has mounted thereon for rotation therewith a large sprocket wheel 63 over which sprocket wheel 63 is trained a sprocket chain 64, which chain 64 is in turn trained over the sprocket 65 on an adjacent end of a counter shaft 66, which shaft 66 extends transversely of the inclined frame and has its ends journaled in the frame members 7—7.

This counter shaft 66 extends between the lowermost roller 45 and beater roller 50. This counter shaft 66 has a chain and sprocket connection 67 with one end of the upper roller 46 at the side of the machine. Likewise, the upper shaft 40 of the conveyor 56 at one end thereof has a chain and sprocket connection 68 with the lowermost roller 45 at said one side of the machine.

For the chain 64, and the chain of the chain and sprocket connection 67 there is provided for each a take up device designated generally by the reference character 69. Each of these take up devices are identical in construction and are conventional in form, the purpose of the same to take up slack in their respective chains as the roller 46 and drum 50 work against the action of the springs 49 and 54 respectively.

As shown to advantage in Figure 2, on the opposite end of the rotating axis 6 there is mounted for rotation therewith a relatively large sprocket wheel 70 over which is trained a sprocket chain 71 which chain 71 is also trained over a sprocket 72 carried by the pintle on an adjacent end of the roller 50.

There is also provided a suitable take up device 73 for the sprocket chain 71. The take up device 73 is identical in construction with the take up devices 69 herein before referred to. On this side of the frame, the lowermost drum 45 is equipped with a sprocket 74 over which is trained an endless sprocket chain 75, said chain 75 being also trained over a sprocket 76 on the adjacent end of the forward shaft 57 of the endless conveyor 56a.

It is yet to be mentioned that on the opposite side of the machine or on that side shown in Figure 3, the counter shaft 66 is also provided with a gear 77 adapted to mesh with a gear 78 on the adjacent end of the pintle or shaft of the lowermost roller 45.

From the foregoing, it will be seen that as the machine is drawn over the ground the endless conveyors 56 and 56a, and the rollers 45 and 46, together with the beater roller 50 all operate in unison and simultaneously so as to effect a continuous movement of the sod dug up during the operation of the machine rearwardly to the conveyor 56, at which point, the quack grass is separated from the dirt or earth which dirt or earth will fall to the ground and the remaining quack grass or roots conveyed to the end of the conveyor 56a from which it will drop to the ground to pile up in deposits along the route or line of travel of the machine.

It is believed that from the foregoing description, taken in connection with the accompanying drawings, a clear understanding of the construction, operation, utility and advantages of a quack grass digging machine of this character may be had without a more detailed description.

Even though I have herein shown and described the preferred embodiment of my invention, it is to be understood that the same is susceptible to changes fully comprehended by the spirit of the invention as herein described and the scope of the appended claims.

Having thus described my invention, what I claim as new is:

1. In a machine of the class described, a wheel supported main frame, an inclined frame mounted on the main frame adjacent the forward end of the latter, a conveyor in each of said frames, means for imparting rocking movement to the conveyor in said main frame, side members extending forwardly from the lower end of said inclined frame, an axle supported between said side members, wheels journaled on said axle, a transverse plow share mounted at the lower end of said inclined frame, an inverted U-shaped member rockably mounted on said axle, a pair of draft beams extending forwardly from said inclined frame, said draft beams at their free ends connected together, a substantially V-shaped member pivoted intermediate its ends between the connected ends of said draft beams, said substantially V-shaped member at one end being pivotally connected to an intermediate portion of said inverted U-shaped member, and manually controlled means operatively connected with the free end of said substantially V-shaped member for rocking the latter about its pivot.

2. In a machine of the class described, a wheel supported frame, an inclined frame mounted on the first-mentioned frame adjacent the forward end thereof, an endless conveyor arranged in each of said frames, means for imparting rocking movement to the conveyor in said wheel supported frame, a plow share mounted in the lower end of said inclined frame, a pair of side members extending forwardly from the lower end of said inclined frame, wheels supporting the forward ends of said side members, an inverted U-shaped member rockably mounted between said side members, draft beams projecting forwardly from the lower end of said inclined frame, a substantially V-shaped member rockably mounted intermediate its ends between said draft beams, and having one end operatively connected with said inverted U-shaped member, a rock shaft mounted above said wheel supported frame, supporting means for said rock shaft, and means operatively connecting said rock shaft with the free end of said inverted U-shaped member, and manual means for rocking said rock shaft.

3. In a machine of the class described, a wheel supported frame, an inclined frame mounted on said wheel supported frame adjacent the forward end of the latter, a conveyor in each of said frames, a pair of forwardly extending draft beams connected together at their forward ends and having rear ends connected to the lower end of said inclined frame, a plow share mounted between the rear ends of said draft beams forwardly of the lower end of said inclined frame, shanks suspended from said draft beams forwardly of said plow shaft, disks journaled on the lower ends of said shanks, side members extending forwardly from the lower end of said inclined frame, wheels supporting the forward ends of the said side members, a member rockably mounted between said side members, a V-shaped member pivoted at its apex between said draft beams and having one end thereof pivotally connected with said rockably mounted member, and means for rocking said V-shaped member for moving said plow shaft into and out of engagement with the ground.

4. In a machine of the class described, a wheel supported frame, an inclined frame mounted on said wheel supported frame adjacent the forward end of the latter, a conveyor in each of said frames, side members extending forwardly from the elower end of said inclined frame, draft beams extending forwardly from the lower end of said inclined frame and disposed above said side members, wheels supporting the forward ends of said side members, an inverted U-shaped member rockably mounted between said side members, a substantially V-shaped member pivotally mounted between the forward ends of said draft beams, and having one end thereof operatively connected with an intermediate portion of said inverted U-shaped member, manual means operatively connected with the free end of said V-shaped member for rocking the latter, an inclined plow share mounted adjacent the lower end of said inclined frame, and means for supporting said plow share transversely of said inclined frame.

5. A quack grass digger comprising in combination a wheel supported frame, an inclined frame mounted on the first-mentioned frame adjacent the forward end of the latter, a conveyor mounted in each of said frames, a beater mechanism mounted in said inclined frame adjacent the upper end of the conveyor in said inclined frame, a plow share supported at the lower end of said inclined frame and extending transversely thereof, side members extending forwardly from said inclined frame, draft beams extending forwardly from said inclined frame above said side members, wheels supporting the forward ends of said side members, an inverted U-shaped member rockably mounted between said sides, a substantially V-shaped member pivotally mounted between said draft beams and having one end thereof pivotally connected with an intermediate portion of said inverted U-shaped member, and manually controlled means operatively connected with said V-shaped member.

In testimony whereof I affix my signature.

THOMAS J. IRWIN.